(12) United States Patent
Brossard

(10) Patent No.: US 9,845,262 B2
(45) Date of Patent: Dec. 19, 2017

(54) GLAZING COMPRISING A SUBSTRATE COATED WITH A STACK COMPRISING AT LEAST ONE FUNCTIONAL LAYER MADE FROM ZINC-DOPED SILVER

(71) Applicant: SAINT-GOBAIN GLASS FRANCE, Courbevoie (FR)

(72) Inventor: Sophie Brossard, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/036,463

(22) PCT Filed: Nov. 14, 2014

(86) PCT No.: PCT/FR2014/052921
§ 371 (c)(1),
(2) Date: May 13, 2016

(87) PCT Pub. No.: WO2015/071612
PCT Pub. Date: May 21, 2015

(65) Prior Publication Data
US 2016/0297708 A1      Oct. 13, 2016

(30) Foreign Application Priority Data

Nov. 15, 2013     (FR) ..................... 13 61201

(51) Int. Cl.
*B32B 15/04*      (2006.01)
*B32B 17/06*      (2006.01)
(Continued)

(52) U.S. Cl.
CPC ............ *C03C 17/366* (2013.01); *C03C 17/36* (2013.01); *C03C 17/3618* (2013.01);
(Continued)

(58) Field of Classification Search
USPC ....... 428/426, 428, 432, 434, 688, 689, 697, 428/698, 699, 701, 702
See application file for complete search history.

(56) References Cited

U.S. PATENT DOCUMENTS

2005/0008852 A1*  1/2005  Hartig .................... C03C 17/36
                                                                    428/336
2005/0185267 A1   8/2005  Ockenfuss et al.
(Continued)

FOREIGN PATENT DOCUMENTS

CN          101830644 A    9/2010
DE    10 2009 051 796 A1   5/2011
(Continued)

OTHER PUBLICATIONS

International Search Report as issued in International Patent Application No. PCT/FR2014/052921, dated Mar. 25, 2015.

*Primary Examiner* — Lauren R Colgan
(74) *Attorney, Agent, or Firm* — Pillsbury Winthrop Shaw Pittman LLP

(57) ABSTRACT

A glazing includes a transparent substrate coated with a stack of thin layers including at least one functional metal layer and at least two antireflective coatings, each antireflective coating including at least one dielectric layer, so that each functional metal layer is positioned between two antireflective coatings. The stack includes at least one silver-based functional metal layer including at least 95.0% by weight of silver, with respect to the weight of the functional layer, and from 0.5 to 3.5% by weight of zinc, with respect to the weight of zinc and silver in the functional layer.

22 Claims, 5 Drawing Sheets

(51) Int. Cl.
*C03C 17/36* (2006.01)
*E06B 9/24* (2006.01)

(52) U.S. Cl.
CPC ...... *C03C 17/3626* (2013.01); *C03C 17/3644* (2013.01); *C03C 17/3647* (2013.01); *C03C 17/3681* (2013.01); *E06B 9/24* (2013.01); *C03C 2217/212* (2013.01); *C03C 2217/216* (2013.01); *C03C 2217/256* (2013.01); *C03C 2217/281* (2013.01); *C03C 2217/73* (2013.01); *C03C 2217/944* (2013.01); *E06B 2009/2417* (2013.01)

(56) References Cited

U.S. PATENT DOCUMENTS

| | | | | |
|---|---|---|---|---|
| 2008/0311389 | A1* | 12/2008 | Roquiny | C03C 17/36 428/336 |
| 2010/0136365 | A1* | 6/2010 | Unquera | C03C 17/36 428/623 |
| 2012/0225224 | A1* | 9/2012 | Blacker | C03C 17/36 428/34 |
| 2014/0170434 | A1* | 6/2014 | Hassan | G02B 1/10 428/552 |

FOREIGN PATENT DOCUMENTS

| | | |
|---|---|---|
| WO | WO 2004/006228 A2 | 1/2004 |
| WO | WO 2009/001143 A1 | 12/2008 |
| WO | WO 2010/037968 A1 | 4/2010 |

\* cited by examiner

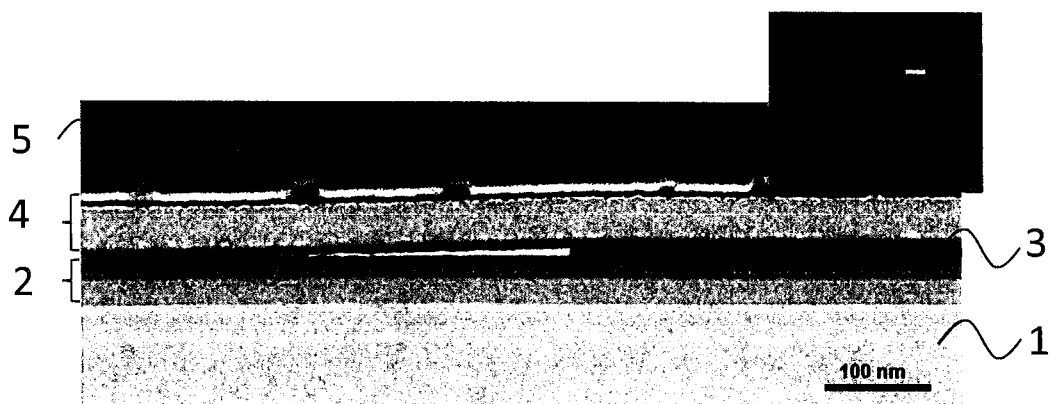
Figure 1.b
Figure 1.a
Figure 2

GLAZING COMPRISING A SUBSTRATE COATED WITH A STACK COMPRISING AT LEAST ONE FUNCTIONAL LAYER MADE FROM ZINC-DOPED SILVER

CROSS-REFERENCE TO RELATED APPLICATIONS

This application is the U.S. National Stage of PCT/FR2014/052921, filed Nov. 14, 2014, which in turn claims priority to French Application No. 1361201, filed Nov. 15, 2013. The contents of all of these applications are incorporated herein by reference in their entirety.

The invention relates to a glazing comprising a transparent substrate coated with a stack of thin layers comprising at least one silver-based functional metal layer.

Silver-based functional metal layers (or silver layers) have advantageous properties of electrical conduction and of reflection of infrared (IR) radiation, hence their use in "solar control" glazings targeted at reducing the amount of solar energy entering and/or in "low-e" glazings targeted at reducing the amount of energy dissipated toward the outside of a building or vehicle.

These silver layers are deposited between antireflective coatings which generally comprise several dielectric layers making it possible to adjust the optical properties of the stack. In addition, these dielectric layers make it possible to protect the silver layer from chemical or mechanical attacks.

The optical and electrical properties of the glazings depend directly on the quality of the silver layers, such as their crystalline state, their homogeneity and their environment, such as the nature and the surface roughness of the interfaces above and below the silver layer.

It is known, in order to improve the quality of silver-based functional metal layers, to use antireflective coatings comprising dielectric layers having a stabilizing function which are intended to promote the wetting and the nucleation of the silver layer.

With this same objective, it is also known to use blocking layers located between a functional layer and an antireflective coating, the function of which is to protect these functional layers from possible damage during the deposition of the upper antireflective coating and/or during a heat treatment. Numerous possibilities varying in particular in the nature, the number and the position of said blocking layers have been provided.

The invention relates very particularly to a glazing which has to be subjected to a high-temperature heat treatment, such as an annealing, a bending and/or a tempering. The mechanical properties of the glazings subjected to heat treatments are often insufficient. This is because, when scratches are created on a glazing before heat treatment, their visibility considerably increases when the glazing is subjected to a heat treatment of tempering type. This phenomenon appears to be partly related to the presence of defects in the functional layer.

This is because high-temperature heat treatments can cause modifications within the silver layer and in particular generate defects. Some of these defects exist in the hole or dome form.

The defects of "hole" type correspond to the appearance of regions devoid of silver exhibiting a circular or dendritic shape, that is to say to a partial dewetting of the silver layer. The silver layer, after heat treatment, is a silver layer comprising holes of circular or dendritic shape corresponding to the silver-free regions. The silver layer observed with a microscope appears flat. The thickness of this layer, taken at the regions with silver, does not vary by very much.

The defects of "dome" type correspond to the presence of "large" silver grains which cause variations in thickness within the silver layer, that is to say thickened regions and thinned regions. The variation in thickness can be pointwise, that is to say observed solely at said "large" grains. The silver layer can then have a homogeneous thickness except at the large crystals. The variation in thickness can be more extensive as a result of a rearrangement of the silver layer around said "large" grains.

The defects of "dome" type do not correspond to an intermediate state of defects of "hole" type.

FIG. 1.a is an image in section taken with a transmission microscope of a defect of hole type. FIG. 1.b is an image taken with a scanning electron microscope which locates, by the white line, the section of FIG. 1.a.

FIG. 2 is an image in section taken with a transmission microscope of a defect of dome type.

In these figures, the glass substrate 1, the antireflective coating 2 comprising several dielectric layers located below the silver layer, the silver layer 3, the antireflective coating 4 located above the silver layer and a protective layer 5 are made out. These images clearly show the difference between defects of hole type and of dome type.

The presence of defects modifies not only the visual appearance but also the optical properties and the electrical conductivity of the stack.

The presence of these defects generates points of corrosion. This phenomenon is particularly important in the stacks where many defects of dome type are formed subsequent to a heat treatment. These points of corrosion are often visible even in normal light.

The presence of these defects also causes phenomena of scattering of the light manifested visually by the appearance of a luminous halo known as "haze", generally visible under intense light. The haze corresponds to the amount of the transmitted light which is scattered at angles of more than 2.5°.

The reasons and mechanisms for the formation of these defects are still poorly understood. The occurrence of the defects of hole or dome type appears to be strongly dependent on the nature of the dielectric layers making up the antireflective coatings located above and below the silver layer. The presence of certain dielectric materials in the stack, in particular certain oxides, increases the formation of certain defects (hole or dome).

The applicant has discovered that the presence of a dielectric layer based on silicon nitride optionally doped with aluminum generates far fewer defects of hole type or of dome type during a high-temperature heat treatment.

The applicant has discovered that the presence of a dielectric layer based on titanium oxide ($TiO_2$), on niobium oxide ($Nb_2O_5$) or on tin oxide ($SnO_2$) in antireflective coatings promotes the formation of defects of hole type during a high-temperature heat treatment.

The applicant has discovered that the presence of a dielectric layer based on zinc tin oxide (SnZnO) in antireflective coatings promotes the formation of defects of dome type.

In point of fact, these materials are optically advantageous materials. A solution targeted at not using this type of material in antireflective coatings is not satisfactory.

The Chinese patent CN101830644 discloses a substrate coated with a stack comprising a functional layer based on silver alloyed with three metals: copper, zinc and chromium.

The solutions of the prior art are not entirely satisfactory.

The use of blocking layers prevents the presence of haze and corrosion but in a limited way.

The preparation of a functional layer based on silver alloyed with three metals is complex and modifies the electrical properties of the functional layer, in particular the conductivity. Any addition of dopant significantly damages the conductivity.

The objective of the invention is to develop a glazing comprising a substrate coated with a stack comprising at least one silver-based functional layer exhibiting a lower ability to be scratched subsequent to a heat treatment of bending, tempering or annealing type. This property has to be obtained without modifying the other properties expected for stacks comprising a silver-based functional metal layer, very particularly without significantly modifying the conductivity.

Another objective of the invention is to provide a glazing comprising a substrate coated with a stack comprising an antireflective coating comprising a dielectric layer capable of generating defects of dome type in the silver-based functional layer. The glazing has to be able to be subjected to high-temperature heat treatments and to retain its optical quality, in particular a low haze value, its mechanical strength and its resistance to corrosion under hot conditions, despite the presence of the layer capable of generating defects of dome type.

A subject matter of the invention is a glazing comprising a transparent substrate coated with a stack of thin layers comprising at least one functional metal layer and at least two antireflective coatings, each antireflective coating comprising at least one dielectric layer, so that each functional metal layer is positioned between two antireflective coatings, characterized in that the stack comprises at least one silver-based functional metal layer comprising:

at least 95.0%, preferably at least 96.5% and better still at least 98.0% by weight of silver, with respect to the weight of the functional layer, and from 0.5 to 3.5%, preferably from 1.0 to 2.0%, by weight of zinc, with respect to the weight of zinc and silver in the functional layer.

The limitation according to which the silver-based functional metal layer comprises at least 95.0%, preferably at least 96.5% and better still at least 98.0% by weight of silver, with respect to the weight of the functional layer, means that the total weight of optional dopants, other than zinc, or of impurities does not exceed 5.0%, preferably 3.5% and better still 2.0% of the weight of the functional layer. Preferably, the silver-based functional metal layer is doped solely with zinc. It comprises less than 1.0% by weight of metals other than silver and zinc, with respect to the weight of the silver-based functional metal layer.

The doping with zinc can be measured, for example, by Castaing microprobe (Electron Probe MicroAnalyzer or EPMA) analysis.

The doping of the silver layer with zinc makes it possible to improve the aptitude for scratching before and after heat treatment, whatever the structure of the stack and the defects capable of being generated.

Zinc is an element which is soluble in silver. After annealing, it tends to remain in solid solution in the silver grains. Its presence should, under normal circumstances, damage the conductivity of the functional layer and thus of the stack.

In point of fact, the desired properties are obtained after heat treatment without a significant decrease in the conductivity when the proportions by weight of zinc do not exceed 3.5%. This can be attributed to the low proportions of zinc used but also to the improvement in the sheet resistance due to the nondeterioration of the silver layer.

The solution of the invention is very particularly suitable when the stack comprises at least one antireflective coating comprising a dielectric layer capable of generating defects of dome type.

The doping of the silver layer with zinc according to the proportions claimed makes it possible to considerably reduce the formation of defects of dome type responsible for the haze and for the appearance of corrosion after heat treatment.

The dielectric layers capable of generating defects of dome type can be identified by virtue of an analysis by optical microscopy or by scanning electron microscopy. For this, a dielectric layer is deposited on a substrate in contact with or close to a silver layer. The assembly is subjected to a heat treatment. Observation of the images makes it possible to identify if defects are generated. If appropriate, if these defects are of hole type or dome type.

Preferably, the antireflective coating comprising a dielectric layer capable of generating defects of dome type is located below a silver-based functional metal layer.

The dielectric layers capable of generating defects of dome type are chosen from layers based on zinc tin oxide of general formula $Sn_xZn_yO_z$, in which the Sn/Zn ratio by weight is between 50/50 and 85/15, preferably between 55/45 and 75/25 or also, according to another advantageous form, between 50/50 and 64/36. The layer of general formula $Sn_xZn_yO_z$ is preferably obtained in the antireflective stack by reactive cathode sputtering of a target composed of an alloy of tin and zinc, in an oxidizing atmosphere.

Another advantageous embodiment consists in avoiding the use of dielectric layers capable of generating defects of hole type close to the silver layer and preferably throughout the stack. Preferably, the stack does not comprise an antireflective coating comprising a dielectric layer capable of generating defects of hole type chosen from layers based on titanium oxide ($TiO_2$), on niobium oxide ($Nb_2O_5$) or on tin oxide ($SnO_2$).

Advantageously, the silver-based functional metal layer is in this case separated by at least 10 nm, preferably by at least 20 nm, from all layers capable of generating defects of hole type. The silver-based functional metal layer is separated by at least 10 nm, preferably by at least 20 nm, from all titanium-comprising layers.

Throughout the description, the substrate according to the invention is regarded as being placed horizontally. The stack of thin layers is deposited above the substrate. The meaning of the expressions "above" and "below" and "lower" and "upper" is to be considered with respect to this orientation. If not specifically stipulated, the expressions "above" and "below" do not necessarily mean that two layers and/or coatings are positioned in contact with one another. Where it is specified that a layer is deposited "in contact" with another layer or with a coating, this means that there cannot be one (or more) layer(s) inserted between these two layers (or layer and coating).

Unless otherwise mentioned, the thicknesses referred to in the present document are physical thicknesses. The term "thin layer" is understood to mean a layer exhibiting a thickness of between 0.1 nm and 100 micrometers.

According to an advantageous embodiment, the stack can comprise:

an antireflective coating located below the silver-based functional metal layer comprising at least one dielectric layer based on zinc tin oxide and a dielectric layer having a stabilizing function based on zinc oxide, a functional metal layer based on silver comprising zinc located immediately in contact with the dielectric layer having a stabilizing function based on zinc oxide, optionally a blocking overlayer, an antireflective coating located above the silver-based functional metal layer, optionally an upper protective layer.

The thickness of the silver-based functional layers is, by increasing order of preference, of from 5 to 20 nm or from 8 to 15 nm. These layers can be obtained by deposition by cathode sputtering, either starting from two targets or starting from a zinc-doped silver target.

According to the invention, the silver-based functional metal layer can be directly in contact with a blocking layer. A blocking layer positioned under a functional layer in the direction of the substrate is known as blocking underlayer "UB". A blocking layer positioned on the functional layer on the opposite side from the substrate is known as blocking overlayer "OB".

Preferably, the stack comprises at least one blocking layer located above and immediately in contact with the silver-based functional metal layer.

When a blocking layer is present in contact with a functional layer based on silver doped with zinc according to the invention, use will preferably be made of a layer not comprising titanium. This is because the titanium can react with the zinc and inhibit its action. The Ti—Zn phase diagram shows the formation of several intermetallic compounds. The characteristic according to which the silver-based functional metal layer is separated by at least 10 nm, preferably by at least 20 nm, from all titanium-comprising layers also excludes the presence of a titanium-based blocking layer in contact with the silver-based functional metal layer.

The blocking layer is, for example, a layer based on NiCr, NiCrN, NiCrOx, NiO or NbN. The thickness of each blocking layer, underlayer or overlayer, is at least 0.5 nm and at most 2.0 nm.

When these blocking layers are deposited in the metal, nitrided, partially oxidized or oxynitrided form, they can undergo partial or complete oxidation according to their thickness, for example at the time of the deposition of the following layer.

The antireflective coatings advantageously comprise dielectric layers not capable of generating defects or dielectric layers capable of generating defects of dome type. The dielectric layers of the antireflective coatings can be chosen from oxides or nitrides of one or more elements chosen from titanium, silicon, aluminum, tin and zinc.

Antireflective coatings can comprise dielectric layers having a barrier function and/or dielectric layers having a stabilizing function.

The term "dielectric layers having a barrier function" is understood to mean a layer made of a material capable of forming a barrier to the diffusion of oxygen and water at high temperature, originating from the ambient atmosphere or from the transparent substrate, toward the functional layer. The dielectric layers having a barrier function can be:

based on silicon compounds chosen from oxides, such as $SiO_2$, silicon nitrides $Si_3N_4$ and oxynitrides $SiO_xN_y$, optionally doped using at least one other element, such as aluminum, based on aluminum nitrides AlN or based on mixed zinc tin oxide.

The term "dielectric layers having a stabilizing function" is understood to mean a layer made of a material capable of stabilizing the interface between the functional layer and this layer. The dielectric layers having a stabilizing function are preferably based on crystalline oxide, in particular based on zinc oxide, optionally doped using at least one other element, such as aluminum. The dielectric layer or layers having a stabilizing function are preferably zinc oxide layers.

Preferably, each functional metal layer is above an antireflective coating, the upper layer of which is a dielectric layer having a stabilizing function, preferably based on zinc oxide, and/or below an antireflective coating, the lower layer of which is a dielectric layer having a stabilizing function.

The final layer of each antireflective coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and enhances its quality and its stability at high temperature. It is also advantageous to have a layer having a stabilizing function, for example based on zinc oxide, above a functional layer.

The dielectric layer or layers having a stabilizing function can thus be found above and/or below at least one functional layer or each functional layer, either directly in contact with it or separated by a blocking layer. Preferably, each functional metal layer is above an antireflective coating, the upper layer of which is a dielectric layer having a stabilizing function, preferably based on zinc oxide, and/or below an antireflective coating, the lower layer of which is a dielectric layer having a stabilizing function, preferably based on zinc oxide.

This dielectric layer having a stabilizing function can have a thickness of at least 5 nm, in particular a thickness of between 5 and 25 nm and better still from 8 to 15 nm.

A particularly advantageous embodiment relates to a glazing comprising a substrate coated with a stack comprising, starting from the transparent substrate:

an antireflective coating comprising at least one dielectric layer having a barrier function and at least one dielectric layer having a stabilizing function, a functional layer, a blocking layer, an antireflective coating comprising at least one dielectric layer having a stabilizing function and a dielectric layer having a barrier function.

The stack can comprise an upper protective layer deposited as final layer of the stack, in particular in order to confer scratch-resistant properties. These upper protective layers are not regarded as included in an antireflective coating. These upper protective layers are separated from the functional layers at least by an antireflective coating, the thickness of which is generally greater than 20 nm. These layers are generally ultrathin and have in particular a thickness of between 2 and 5 nm.

The substrate can be made of any material capable of withstanding the high temperatures of the heat treatment. The transparent substrates according to the invention are preferably made of a rigid inorganic material, such as made of glass, in particular soda-lime-silica glass. The thickness of the substrate generally varies between 0.5 mm and 19 mm. The thickness of the substrate is preferably less than or equal to 6 mm, indeed even 4 mm.

The glazing comprising the substrate coated with the stack may have been subjected to a high-temperature heat treatment. The heat treatments are chosen from an annealing, for example from a flash annealing, such as a laser or flame annealing, a tempering and/or a bending. The heat treatment temperature is greater than 300° C., preferably greater than 400° C. and better still greater than 500° C.

The substrate coated with the stack can be is a bent or tempered glass.

The glazing can be in the form of a monolithic glazing, of a laminated glazing, of an asymmetric glazing or of a multiple glazing, in particular a double glazing or a triple glazing.

The glazing according to the invention can be a laminated glazing. In this case, the substrate comprises at least two rigid substrates of the glass type assembled by at least one sheet of thermoplastic polymer, in order to exhibit a structure of glass/stack of thin layers/sheet(s)/glass type. The polymer can in particular be based on polyvinyl butyral PVB, ethylene/vinyl acetate EVA, polyethylene terephthalate PET or polyvinyl chloride PVC. In a laminated structure, the substrate carrying the stack can be in contact with the polymer sheet.

The invention also relates to a process for the manufacture of the substrate as defined above. According to this process, the stack of thin layers is deposited on the substrate by a vacuum technique of the cathode sputtering type, optionally assisted by a magnetic field.

BRIEF DESCRIPTION OF THE DRAWINGS

FIG. 1.*a* is an image in section taken with a transmission microscope of a defect of hole type;

FIG. 1.*b* is an image taken with a scanning electron microscope which locates, by the white line, the section of FIG. 1.*a*;

FIG. 2 is an image in section taken with a transmission microscope of a defect of dome type;

EXAMPLES

Figure 3:
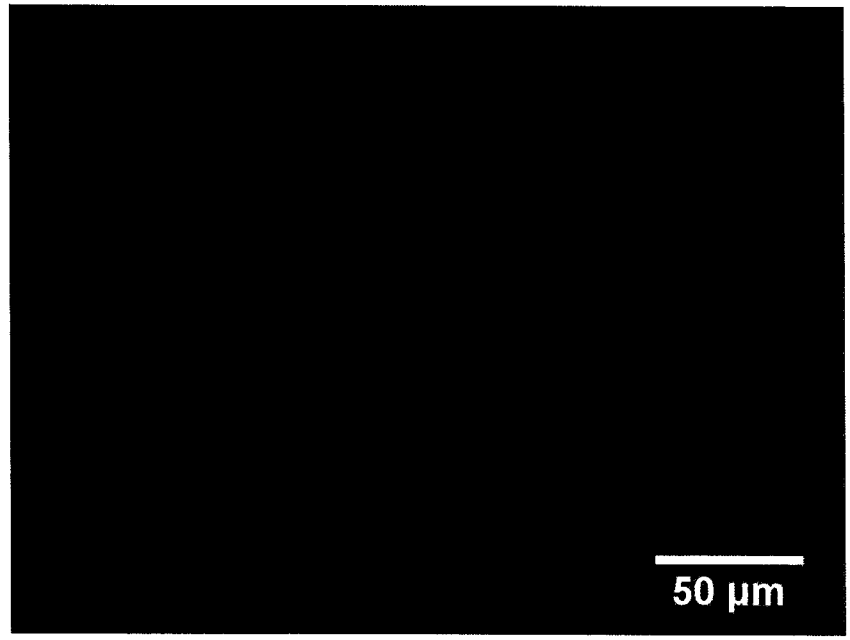
FIG. 3 is an SEM image of a substrate coated with a stack comprising a silver layer which has not been subjected to a heat treatment.

I. Preparation of the Glazings: Materials and Deposition Conditions

Stacks of thin layers defined below are deposited on substrates made of clear soda-lime glass with a thickness of 2 or 4 mm.

For these examples, the conditions for deposition of the layers deposited by sputtering ("magnetron cathode" sputtering) are summarized in table 1 below.

The doping of the layer of silver with zinc is carried out by co-sputtering starting from two targets, a Ag target and a zinc target. During the deposition, the two targets are placed inclined and powered up at the same time. The desired doping is obtained by adjusting the deposition powers. The deposition power of the silver target is fixed and the deposition power of the zinc target is varied. Layers of silver doped with zinc, with proportions of zinc of between 0 and 3.5% by weight with respect to the weight of silver and zinc, were tested. In all the examples which follow, the composition of the layers and in particular the proportions of zinc in the zinc-doped silver layer was measured by conventional Castaing microprobe (also known as Electron Probe Microanalyser or EPMA) techniques. The concentration of zinc is expressed as weight of zinc, with respect to the weight of silver and zinc.

TABLE 1

| | Targets employed | Deposition pressure | Gas(es) | Index* |
|---|---|---|---|---|
| $Si_3N_4$ | Si:Al (9:8 weight %) | $2.10^{-3}$ mbar | Ar 47% - $N_2$ 53% | 2.00 |
| ZnO | Zn:Al (98:2 weight %) | $2.10^{-3}$ mbar | Ar 95% - $O_2$ 5% | 2.04 |
| NiCr | Ni:Cr (80:20 at. %) | $2.10^{-3}$ mbar | 100% Ar | — |
| Ag | Ag | $2.10^{-3}$ mbar | 100% Ar | — |
| Ag:Zn | Ag and Zn | $2.10^{-3}$ mbar | 100% Ar | — |
| $TiO_2$ | $TiO_x$ | $2.10^{-3}$ mbar | Ar 94% - $N_2$ 6% | 2.32 |
| SnZnO | Sn:Zn (50:50 weight %) | $2.10^{-3}$ mbar | Ar 25% - $N_2$ 75% | 2.09 | at.: atomic;
*at 550 nm

The materials and the physical thicknesses in nanometers (unless otherwise indicated) of each layer or coating which make up the stacks are listed in the tables below as a function of their positions with respect to the substrate carrying the stack.

| Glazing | Layers | Cp. 1 | Cp. 2 | Cp. 3 | Stack 1 | Stack 2 |
|---|---|---|---|---|---|---|
| Protective layer | $TiO_2$ | 2 | 2 | 2 | 2 | 2 |
| Antireflective coating AR2 | $Si_3N_4$ | 40 | 40 | 40 | 40 | 40 |
| | ZnO | 5 | 5 | 5 | 5 | 5 |
| Blocking layer OB | NiCr | 0.5 | 0.5 | 0.5 | 0.5 | 0.5 |
| Functional layer | Ag | 10 | 10 | 10 | — | — |
| | Ag:Zn | — | — | — | 10 | 10 |
| Antireflective coating AR1 | ZnO | 5 | 5 | 5 | 5 | 5 |
| | $TiO_2$ | — | — | 10 | — | — |
| | $Si_3N_4$ | 25 | — | 25 | 25 | — |
| | $SnZnO_x$ | — | 30 | — | — | 30 |
| Substrate (mm) | glass | 4 | 4 | 4 | 4 | 4 |
| FIGS. | — | — | 4 | 5 | 6 | — | 7 to 9 |

The glazings stack 1 and stack 2 are glazings comprising the stack described with a functional layer exhibiting a variable doping with zinc.

II. Change in the Sheet Resistance as a Function of the Doping with Zinc After Heat Treatment The sheet resistance of substrates comprising Stack 1 with silver-based functional layers comprising increasing doping with zinc was evaluated. The sheet resistance Rsq, corresponding to the resistance relative to the surface area, is measured by induction with a Nagy SMR-12. The sheet resistance was measured before heat treatment (BHT) and after a heat tempering (AHT) under the following conditions: 10 minutes at a temperature of 650° C.

The sheet resistance results obtained for coated substrates, before and after tempering, as a function of the doping with zinc, are given in the table below.

| | Proportions by weight of Zn | | | | |
|---|---|---|---|---|---|
| Example | 0 | 0.4 | 0.8 | 1.9 | 3.5 |
| Rsq before tempering | 5.6 ± 0.2 | 5.9 ± 0.2 | 6.7 ± 0.2 | 8.6 ± 0.2 | 10 ± 0.2 |
| Rsq after tempering | 4.7 ± 0.2 | 4.5 ± 0.2 | 4.9 + 0.2 | 6.6 ± 0.2 | 7.3 ± 0.2 |

For proportions of zinc of between 0.1 and 2.0% by weight, after heat treatment, levels of sheet resistance are achieved which are equivalent to those obtained with non-heat-treated stacks comprising a layer based on silver which has not been doped.

In conclusion, the doping of the silver layer with zinc according to the proportions claimed does not significantly modify the resistivity or the electrical conductivity of the stack.

III. Effect of the Doping with Zinc on the Mechanical Strength

The resistance to scratching of substrates comprising Stack 1 with functional layers based on silver comprising increasing doping with zinc, as are described above, was tested. Erichsen Scratch Tests (EST) were carried out under the following conditions:
  EST: before having been subjected to heat a treatment,
  ESTHT: after having been subjected to a heat treatment under the following conditions: 10 minutes at a temperature of 620° C.,
  HTEST: after having been subjected to a heat treatment of tempering type under the following conditions: 10 minutes at a temperature of 620° C.

This test consists in recording the value of the force necessary, in newtons, to produce a scratch in the stack when the test is carried out (Van Laar tip, steel ball).

The tendency observed is an improvement in the mechanical strength before heat treatment, after heat treatment and after tempering when the proportions of zinc increase.

A decrease in the depth of the scratches for stacks comprising an increasing proportion of zinc in the silver layer has also been observed.

The results of the measurement of the width of the scratches in μm according to the force applied to generate a scratch for coated substrates before heat treatment (EST) and after tempering (HTEST) according to the doping with zinc are given in the table below.

| Depth of the scratches (μm) | Proportion by weight of Zn | | | | |
|---|---|---|---|---|---|
| | 0 | 0.4 | 0.8 | 1.9 | 3.5 |
| EST 7N | 67 ± 10 | 100 ± 10 | 50 ± 10 | 60 ± 10 | 42 ± 10 |
| EST 10N | 134 ± 10 | 138 ± 10 | 120 ± 10 | 101 ± 10 | 70 ± 10 |
| HTEST 0.5N | 19 ± 10 | 19 ± 10 | 10 ± 10 | 10 ± 10 | 10 ± 10 |
| HTEST 1N | 36 ± 10 | 39 ± 10 | 26 ± 10 | 15 ± 10 | 12 ± 10 |

The improvement contributed by the doping with zinc to the decrease in the width of the scratches is significant. In all cases, before or after heat treatment, a significant decrease is found with an increase in the proportions of zinc.

IV. Improvement in the Haze in the Stacks Comprising Layers Capable of Generating Defects of Dome Type These tests were carried out with substrates comprising Stack 2 with functional layers based on silver comprising increasing doping with zinc.

1. Microscope Observations

The morphology of the layers is analyzed by optical microscopy and by scanning electron microscopy. These tests demonstrate the different defects generated as a function of the nature of the dielectric layers in the antireflective coating under the silver layer.

FIG. 3 is an SEM image of a substrate coated with a stack comprising a silver layer which has not been subjected to a heat treatment. No defect can be observed.

Figure 4:
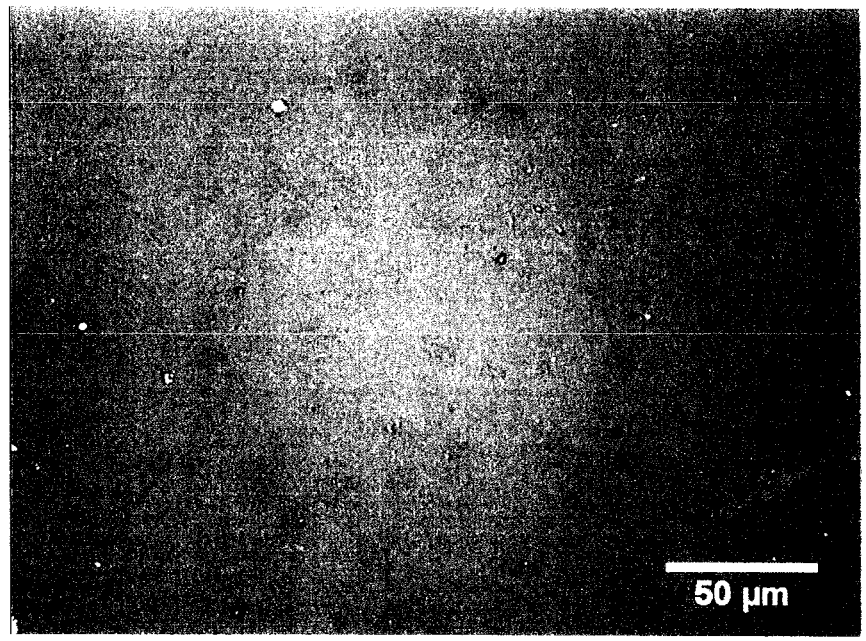
FIG. 4 illustrates the glazing Cp. 1 not comprising layers capable of generating defects of dome type or of hole type according to an embodiment of the invention.

FIG. 4 illustrates the glazing Cp. 1 not comprising layers capable of generating defects of dome type or of hole type according to the invention. It is observed, on this image, that there are few defects of hole or dome type after heat treatment.

Figure 5:
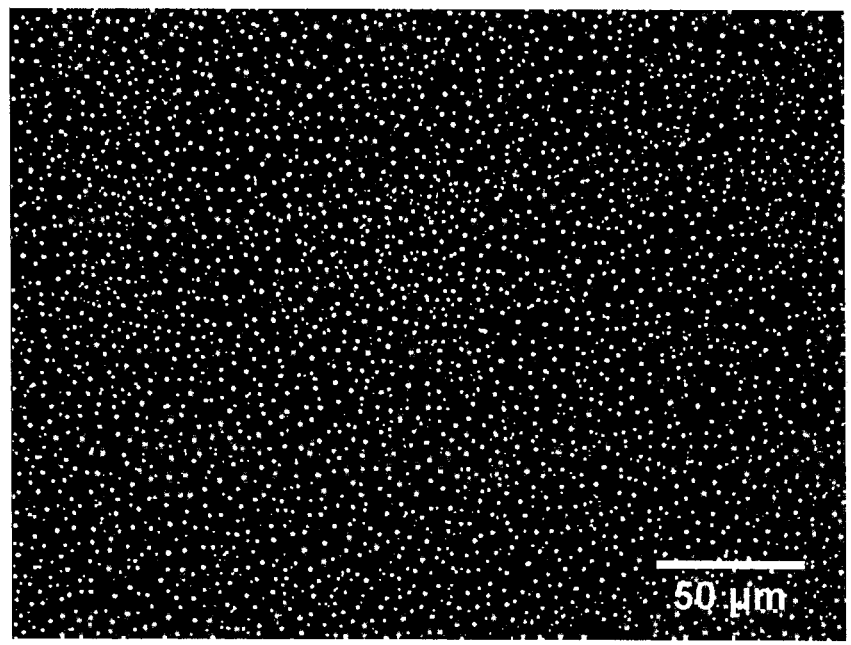
FIG. 5 is an image of the glazing Cp. 2 comprising a stack with a layer capable of generating defects of dome type.

FIG. 5 is an image of the glazing Cp. 2 comprising a stack with a layer capable of generating defects of dome type. This glazing of FIG. 5 differs from the glazing of FIG. 4 solely by the presence of a layer of zinc tin oxide in place of the layer of silicon nitride in the antireflective coating located below the silver-based functional layer. Blemishes of dendritic shape characteristic of the defects of hole type are not observed in this image.

Figure 6:
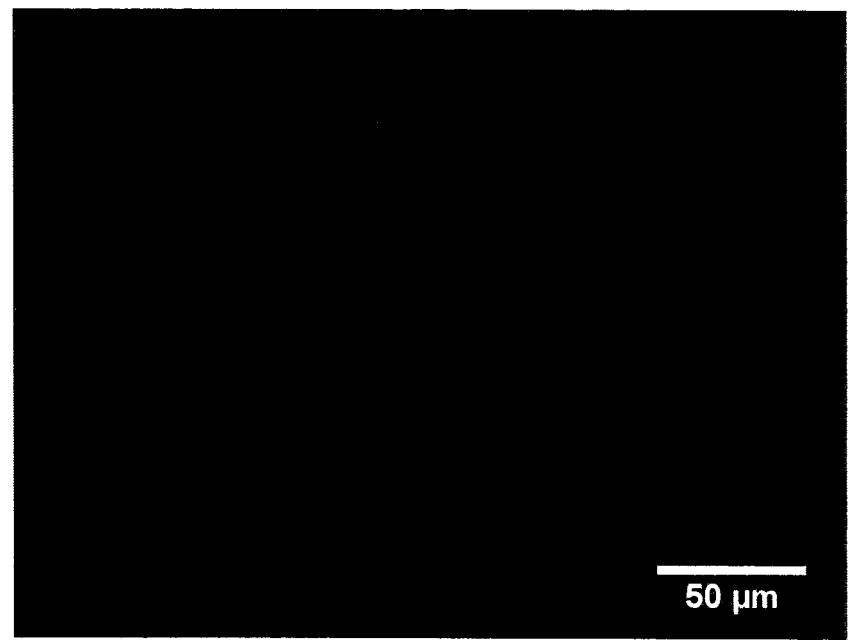
FIG. 6 is an image of the glazing Cp. 3 comprising a stack with a layer capable of generating defects of hole type

FIG. 6 is an image of the glazing Cp. 3 comprising a stack with a layer capable of generating defects of hole type. The black blemishes of dendritic shape correspond to the silver-free regions, that is to say to the defects of hole type obtained after tempering.

These comparative examples clearly show that the nature of the dielectric layers of the antireflective coating influences the presence and the type of defects generated in the silver layers.

The presence of defects of dome type after heat treatment can be quantified by measuring the density of defects of dome type on the heat-treated glazings. The measurement consists in determining the number of domes per $\mu m^2$.

The images taken with a scanning electron microscope (SEM image) of the different glazings and also the density of defects of dome type are summarized in the table below. All these images were taken on glazings which have been subjected to a heat treatment at 600° C.

Figure 7:
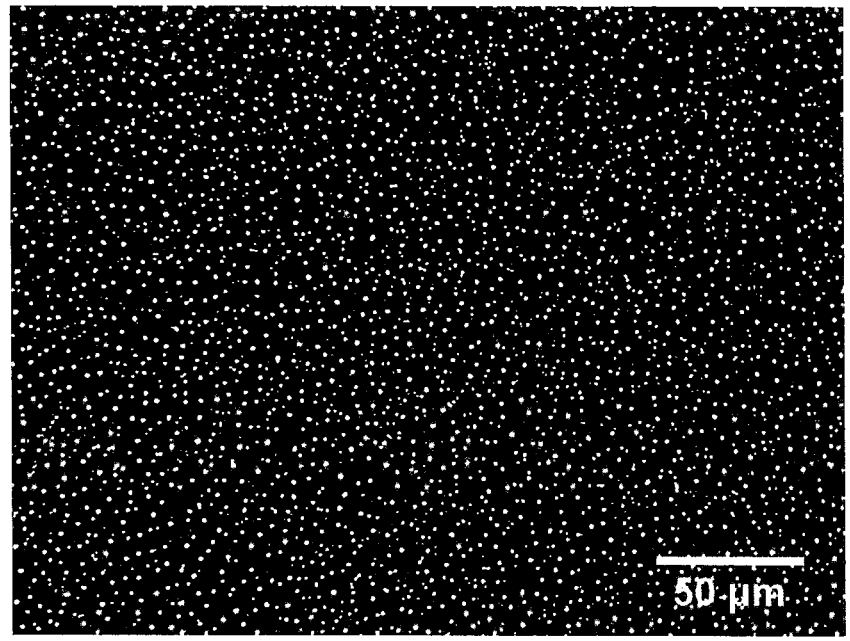
FIG. 7 is an image of a glazing with a functional layer based on silver comprising 0.8% of zinc.
Figure 8:
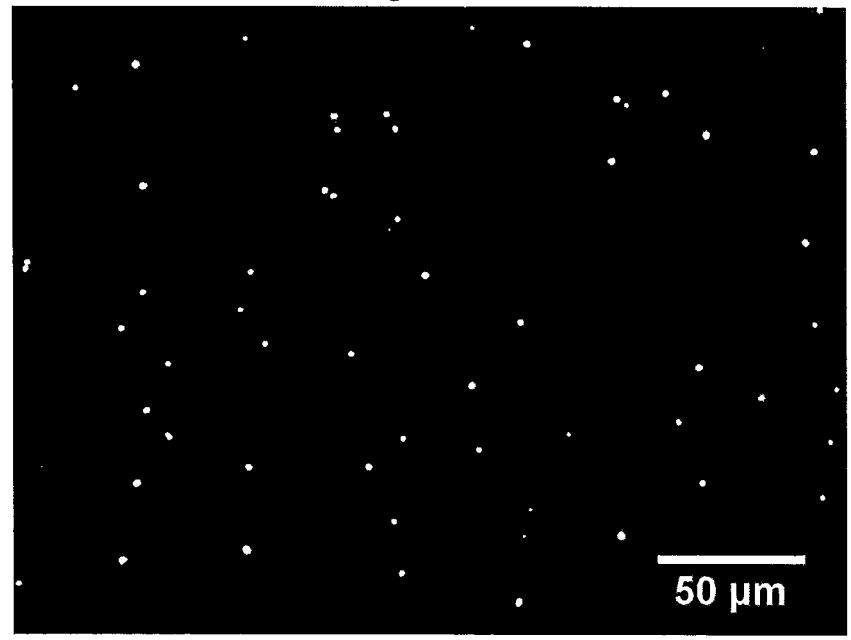
FIG. 8 is an image of a glazing with a functional layer based on silver comprising 1.9% of zinc.
Figure 9:
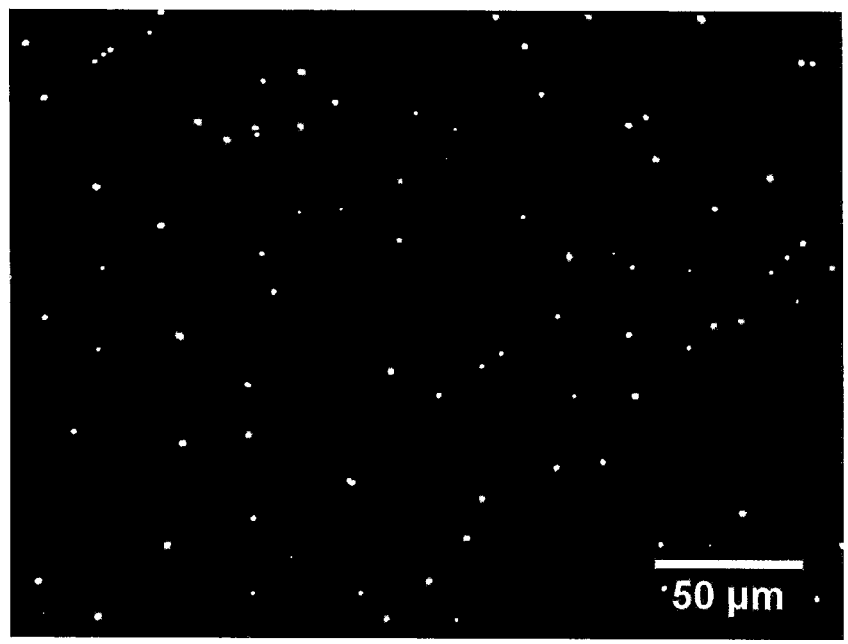
FIG. 9 is an image of a glazing with a functional layer based on silver comprising 3.5% of zinc.

| | Doping with zinc | Domes/$\mu m^2$ |
|---|---|---|
| FIG. 5 | 0% | 0.099 |
| FIG. 6 | 0.4% | 0.053 |
| FIG. 7 | 0.8% | 0.002 |
| FIG. 8 | 1.9% | 0.003 |
| FIG. 9 | 3.5% | 0.003 |

These images, which make it possible to evaluate the dome density, clearly show the effect of the doping with zinc on the decrease of the number of defects of dome type.

2. Evaluation of the Haze, of the Dome Density and of the Corrosion

The variations in haze and in the dome density after heat treatment were evaluated after heat treatment at 600° C. or 650° C. in a Naber furnace for 10 minutes.

The variation in the level of haze was evaluated by measuring the mean visible diffuse reflection MDR with a Perkin-Elmer L900 spectrometer, the specular reflection being ejected from the integrating sphere, and expressed as percentage with respect to total reflection on a calibration mirror.

The density of the domes after heat treatment was evaluated by measuring the proportion of corroded surface on the samples treated at 600° C. and at 650° C. The density of domes corresponds to the number of domes observed per μm².

The level of corrosion after heat treatment was evaluated by measuring the proportion of corroded surface on the samples annealed at 700° C. The corrosion corresponds to the fraction of corroded surface.

The results obtained for the haze, the density of domes after tempering at 600° C. or at 650° C. and the corrosion at 700° C. of the coated substrates as a function of the doping with zinc are given in the table below.

| Example | Tempering | Concentration by weight of Zn | | | | |
| --- | --- | --- | --- | --- | --- | --- |
| | | 0 | 0.4 | 0.8 | 1.9 | 3.5 |
| Haze | 600° C. | 4.4% | 3.93% | 0.39% | 0.46% | 0.26% |
| | 650° C. | 8.65% | 7.81% | 1.16% | 1.04% | 1.67% |
| Dome (number per μm²) | 600° C. | 0.053 | 0.053 | 0.002 | 0.003 | 0.003 |
| | 650° C. | 0.099 | 0.078 | 0.004 | 0.004 | 0.008 |
| Corrosion (as % of area occupied) | 700° C. | 18.1% | 5.9% | 0.2% | 0.1% | 2.8% |

Concentrations by weight of zinc of between 1.0 and 2.0% make possible a real decrease in the density of the domes, in the level of haze and also in the level of corrosion after heat treatment.

The invention claimed is:

1. A glazing comprising a transparent substrate coated with a stack of layers comprising at least one functional metal layer and at least two antireflective coatings, each antireflective coating comprising at least one dielectric layer, so that each functional metal layer is positioned between two antireflective coatings, wherein the stack comprises at least one silver-based functional metal layer consisting of:
at least 96.5% by weight of silver, with respect to the weight of the functional layer, and
from 0.5 to 3.5% by weight of zinc, with respect to the weight of zinc and silver in the functional layer.

2. The glazing as claimed in claim 1, wherein the stack comprises at least one antireflective coating comprising a dielectric layer capable of generating defects of dome type.

3. The glazing as claimed in claim 2, wherein the dielectric layer capable of generating defects of dome type is based on zinc tin oxide.

4. The glazing as claimed in claim 1, wherein the stack does not comprise an antireflective coating comprising a dielectric layer capable of generating defects of hole type chosen from layers based on titanium oxide, on niobium oxide and on tin oxide.

5. The glazing as claimed in claim 1, wherein the stack comprises one or more titanium-comprising layers and wherein the silver-based functional metal layer is separated by at least 10 nm from each of the one or more titanium-comprising layers.

6. The glazing as claimed in claim 5, wherein the silver-based functional metal layer is separated by at least 20 nm from each of the one or more titanium-comprising layers.

7. The glazing as claimed in claim 1, wherein the stack comprises at least one blocking layer located above and immediately in contact with the silver-based functional metal layer.

8. The glazing as claimed in claim 7, wherein the blocking layer is a layer based on NiCr, NiCrN, NiCrO$_x$, NiO or NbN.

9. The glazing as claimed in claim 1, wherein one of the at least two antireflective coatings comprises a dielectric layer capable of generating defects of dome type that is located below a silver-based functional metal layer.

10. The glazing as claimed in claim 1, wherein the antireflective coating located below the silver-based functional metal layer comprises at least one dielectric layer having a stabilizing function immediately in contact with a blocking layer.

11. The glazing as claimed in claim 10, wherein the at least one dielectric layer having a stabilizing function immediately in contact with the blocking layer is based on zinc oxide, optionally doped using at least one other element.

12. The glazing as claimed in claim 11, wherein the at least one other element is aluminum.

13. The glazing as claimed in claim 1, wherein the stack comprises:
an antireflective coating located below the silver-based functional metal layer comprising at least one dielectric layer based on zinc tin oxide and a dielectric layer having a stabilizing function based on zinc oxide,
a functional metal layer based on silver comprising zinc located immediately in contact with the dielectric layer having a stabilizing function based on zinc oxide,
optionally a blocking overlayer,
an antireflective coating located above the silver-based functional metal layer, and
optionally an upper protective layer.

14. The glazing as claimed in claim 1, wherein the thickness of a functional metal layer is between 5 and 20 nm.

15. The glazing as claimed in claim 1, wherein the antireflective coatings comprise at least one dielectric layer having a barrier function based on silicon compounds chosen from oxides, silicon nitrides Si$_3$N$_4$ and oxynitrides SiO$_x$N$_y$, optionally doped using at least one other element.

16. The glazing as claimed in claim 15, wherein the silicon compound is SiO$_2$.

17. The glazing as claimed in claim 15, wherein the at least one other element is aluminum.

18. The glazing as claimed in claim 1, wherein the substrate coated with the stack has been subjected to a heat treatment at a temperature of greater than 300° C.

19. The glazing as claimed in claim 18, wherein the substrate coated with the stack has been subjected to a heat treatment at a temperature of greater than 500° C.

20. The glazing as claimed in claim 1, wherein at least the substrate coated with the stack is made of bent or tempered glass.

21. The glazing as claimed in claim 1, wherein the at least one silver-based functional metal layer comprises at least 98.0% by weight of silver, with respect to the weight of the functional layer.

22. The glazing as claimed in claim 1, wherein the at least one silver-based functional metal layer comprises from 1.0 to 2.0% by weight of zinc, with respect to the weight of zinc and silver in the functional layer.

* * * * *